July 12, 1955  W. M. REESE  2,712,968
BEARING MECHANISM FOR INSTRUMENTS
Filed Feb. 9, 1951
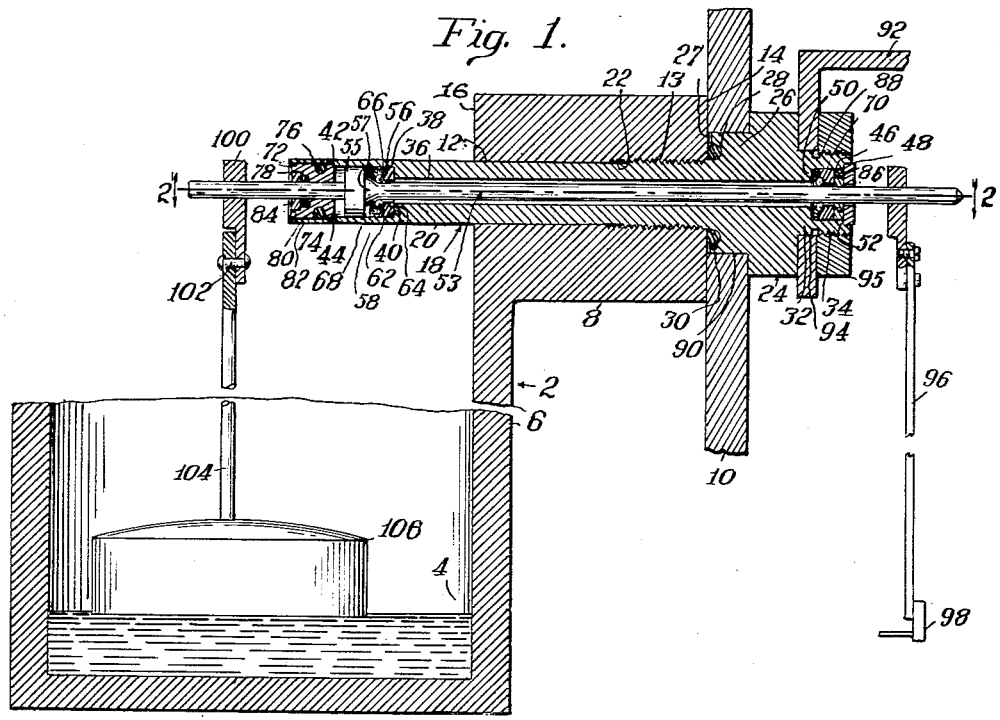
Fig. 1.
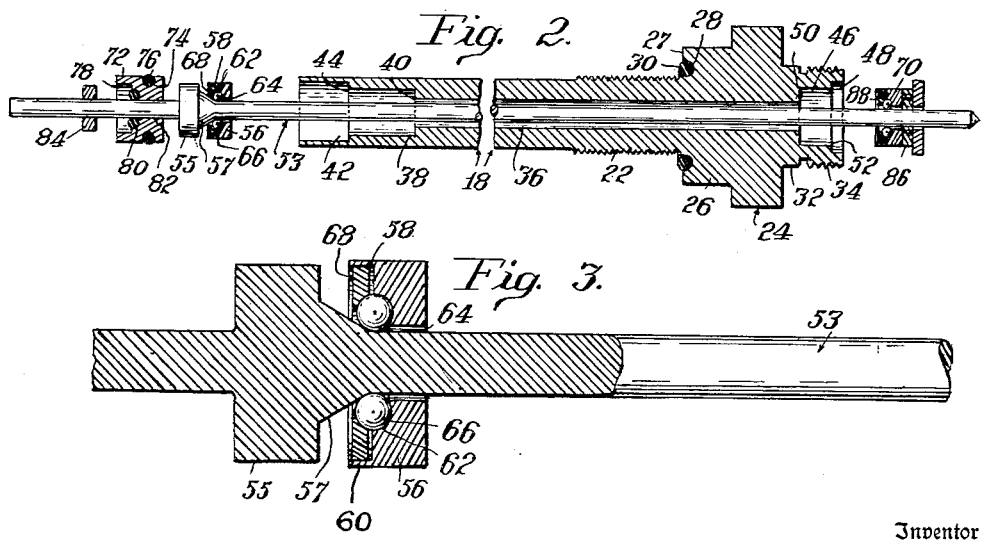
Fig. 2.
Fig. 3.
Inventor
William M. Reese
By J. Huston Swicher
Attorney 2,712,968
Patented July 12, 1955

2,712,968
BEARING MECHANISM FOR INSTRUMENTS

William M. Reese, Odessa, Tex., assignor to Industrial Instrument Corporation, Odessa, Tex., a corporation of Texas Application February 9, 1951, Serial No. 210,132

8 Claims. (Cl. 308—187.1)

This invention relates to a bearing mechanism for instruments, and more specifically, to bearing means for utilization in pressure displacement, level and differential type instruments.

Bearings heretofore devised and now presently in use are subject to many criticisms arising from inherent characteristics which result in inaccurate readings and high maintenance costs. Among the more frequent and typical undesirable factors of the bearings known in the art is their tendency to leak, freeze and corrode under service. Bearings of the type now commonly in use require periodic lubrication and adjustment of the stuffing box or shaft. Further, the engineering design has failed to produce a bearing wherein friction is reduced to a minimum.

These are but a few of the undesirable characteristics and features encountered by users of bearings of the type described.

The instant invention has, as its primary object, the provision of a bearing which is not subject to, and which eliminates, or reduces to a high degree, the faults, defects and other undesirable characteristics referred to above.

A further object of this invention is to provide a bearing of the type described which may be incorporated in all instruments using bearings.

A still further object of this invention is to provide a bearing which will not leak either in vacuum service or under extremely high pressures.

Another object of this invention resides in the provision of a bearing designed in such a manner as to prevent contact of the medium being measured with the moving elements contained within the bearing housing, and wherein the sealing means effectively eliminates and prevents the leaking, freezing and corrosion of the bearing.

Still further, it is an object of this invention to provide a bearing wherein the installation time is reduced to a minimum, the bearing requiring only connection with the pen arm operating linkage and with the float or its linkage, as the case may be.

It is a still further object of this invention to provide a bearing of the type described having its lubricant sealed therein, thereby eliminating lubrication of the bearing at the time of installation and periodic lubrication thereafter.

Other and further objects and advantages of this invention will become more apparent from a consideration of the following specification when read in the light of the annexed drawings, in which:

Fig. 1 is a partial cross-sectional view of a mercury type flow meter with the bearing installed therein;

Fig. 2 is an enlarged, exploded, longitudinal section taken on the lines 2—2 of Fig. 1; and Fig. 3 is a detail cross-section of the thrust bearing.

Referring now more specifically to the drawings, reference numeral 2 indicates, in general, an instrument housing, such as any conventional mercury type flow meter or controller having a mercury well 4 provided therein. A side wall 6 of the housing 2 is constructed with an integrally formed, enlarged boss 8, which extends laterally away from the housing 2 toward a wall 10 of the instrument case. The boss 8 is provided with a bore 12 tapering from its outer face 14 toward its inner face 16. As seen in Fig. 1, the bore 12 is internally threaded at 13 along a portion of its length adjacent the outer face 14.

The bearing, to which this invention pertains, is generally indicated by the reference numeral 18, and comprises an elongated tapered housing 20 externally threaded at 22 intermediate its ends. As seen in Fig. 1, the threads 22 coact with the internal threads 13 of the bore 12 to provide means for releasably securing the housing 20 within the boss 8.

The housing 20, at its outer end (at the right as viewed in Fig. 1), has an integrally formed enlarged head 24 on which is turned an inner collar 26 of reduced diameter having a groove 28 formed in its planar side face 27 adjacent the threads 22. An O-ring seal 30 is positioned within the groove 28.

The enlarged head 24 is also reduced in diameter on its other side to generate a shoulder 32 having an externally threaded end portion 34.

The housing 20 is provided with a longitudinally extending bore 36 therethrough, the diameter of which, at its inner end, is increased at 38 and again at 42 to form internal bearing seats 40 and 44, respectively. The outer end of the bore 36 in the housing 20 is enlarged at 46 and 48 to furnish a bearing seat 50 and a seat 52 for a bearing retainer washer.

An elongated bearing shaft 53 extends longitudinally through the bore 36 and projects beyond the inner and outer ends of the housing 20. Adjacent the inner end of the shaft 53, an integrally formed thrust collar 55 is provided having a tapered neck 57 on one side thereof, engaging against the thrust receiving ball bearings 66. As seen in Fig. 2, the ball bearings 66 are mounted in a groove 62 formed in the bearing retainer 56 at the juncture of the central opening 64 with the plane of the bottom of an annular recess 58 formed in one side of the bearing retainer 56. A lock ring 68 disposed in the recess 58 and confined within the peripheral flange 60 engages against and secures the ball bearings 66 in the retainer 56. The thrust bearing unit is mounted in the enlarged bore 38 and is confined against the seat 40.

Within the other end of the housing 20, the shaft 53 is journaled in an anti-friction bearing 70 engaging against the seat 50 within the enlarged bore 46. This bearing is identical to the bearing 56 and its component parts and consequently will not be described further.

The inner end of the housing 20 is closed and sealed by a member 72 through which the shaft 53 extends. The member 72 is mounted in the enlarged bore 42 and engages against the seat 44. Intermediate its ends, a circumferential groove 74 is formed in the member 72 to receive an O-ring seal 76. One end of the member 72 is recessed at 78 and a groove 80 is formed at the junction of the plane of the base of the recess 78 with the central aperture 82. An O-ring seal is mounted within the groove 80 and is retained in position by an O-ring retainer cap 84 mounted within the recess 78.

The outer end of the housing 20 is closed and sealed by a conventional annular oil seal ring 86 bearing against the exterior face of the bearing 70 and disposed within the bore 46. The oil seal ring 86 is maintained in position by a retainer ring 88 mounted in the enlarged recess 48 against the seat 50.

It will be understood that a lubricant may be introduced into the annulus between the shaft 53 and the side wall of the bore 36 after the shaft 53 has been positioned within the bore 36 and the bearings and their associated elements have been secured at one or the other ends of the housing in their respective positions. This lubricant will be sealed in the annulus by the sealing rings 76, 80 at one end and 86 at the other.

The instrument case wall 10 is transversely apertured at 90 and aligned with the bore 12 of the boss 8. The inner end of the housing 20 is then inserted in the aperture 90 and threaded through the bore 12 in the boss 8, the inner end of the housing coming to rest above the mercury well 4. As the housing 20 is threaded in the bore 12, the enlarged head 24 approaches and bears against the wall 10, the collar 26 snugly fitting within the opening 90, until the wall 10 is tightly clamped between the head 24 and the boss 8.

The actuating mechanism supporting bracket 92 is apertured at 94 to be received and supported on the shoulder 32, and is detachably secured thereon by a locknut 95. The bearing shaft 53 is detachably secured to the lever arm 96 which, in turn, is connected to linkage (not shown) supported on the bracket 92 for actuating any given mechanism, such as a pen 98.

The inner end of the shaft 53 is secured to a mounting 100 pivoted at 102 to the rod 104 projecting upwardly from the float 106 in the well 4.

It is now obvious that differentiations in the height of the mercury column will cause a movement of the rod 104 and the mounting 100 to rotate the shaft 53. Rotation of the shaft 53 is then translated to the pen 98 or other mechanism through the lever 96 and its associated elements.

It will be appreciated that the bearing mechanism herein set forth may be applied to many different types of instruments other than mercury type differential meters and controllers, as mentioned above. Consequently, such reference to these instruments is merely for purpose of illustration and example, and it will be recognized that the invention is not restricted thereto. It will be appreciated, also, that the characteristics as to size, length, etc. of the housing, shaft and associated parts, may be varied to accommodate the invention, particularly, to the instrument to which it may be applied. The details of operation of the instrument and the mechanism thereof have not been described more completely because such instruments are well known in the art and because the invention is applicable to many different types thereof.

Having described this invention in detail, it will be understood that the embodiment herein presented is offered by way of example, and that the invention is only limited by the scope of the appended claims.

I claim:

1. An instrument bearing comprising an elongated tubular housing, a shaft extending through the housing, bearings journaling the shaft in the housing with a chamber between the periphery of the shaft and the inner surface of the housing adapted to receive a lubricant therebetween, said housing having stepped internal portions at one end thereof with a shoulder therebetween, one of the bearings being mounted in one of the stepped portions, a member mounted in the other stepped portion and held by the shoulder spaced from the bearing means, means sealing the periphery of said member from the housing, and means sealing the shaft from said member.

2. An instrument bearing comprising an elongated tubular housing, a shaft extending through the housing, bearings journaling the shaft in the housing with a chamber between the periphery of the shaft and the inner surface of the housing adapted to receive a lubricant therebetween, said housing having stepped internal portions at one end thereof with a shoulder therebetween, one of the bearings being mounted in one of the stepped portions, sealing means mounted in the other stepped portion and held by the shoulder spaced from the bearing means, and a thrust collar rigid on the shaft intermediate the last-mentioned bearing and the sealing means.

3. An instrument bearing comprising an elongated tubular housing, a shaft extending through the housing, bearings journaling the shaft in the housing with a chamber between the periphery of the shaft and the inner surface of the housing adapted to receive a lubricant therebetween, said housing having stepped internal portions at one end thereof with a shoulder therebetween, one of the bearings being mounted in one of the stepped portions, sealing means mounted in the other stepped portion and held by the shoulder spaced from the bearing means, and a thrust collar rigid on the shaft within the first-mentioned stepped portion intermediate the shoulder and the last-mentioned bearing, said thrust collar having a tapered portion in thrust engagement with the last-mentioned bearing.

4. An instrument bearing comprising an elongated tubular housing having a bore therethrough, said housing having portions at opposite ends of the bore of respectively enlarged diameters relative thereto, with shoulders between said portions and between the latter and the bore, a shaft extending through the housing and having a thrust collar thereon rigid therewith located within one of the enlarged portions at an end of the bore, bearings mounted in the innermost of said portions journaling the shaft in the housing with one of said bearings located inwardly of the thrust collar, sealing means mounted in another of said portions at the last-mentioned end of the shaft externally of the thrust collar, and sealing means at the opposite end of the housing externally thereof relative to the adjacent bearing means.

5. An instrument bearing comprising an elongated tubular housing, a shaft extending through the housing, bearings journaling the shaft in the housing with a chamber between the periphery of the shaft and the inner surface of the housing adapted to receive a lubricant therebetween, said bearings including an end-thrust bearing, sealing means mounted in the housing adjacent and spaced from the end-thrust bearing, said sealing means including a member sleeved in the housing and having means for sealing the interior thereof with the shaft and separate means for sealing the exterior thereof with the housing, and a thrust collar rigid on the shaft intermediate the last-mentioned bearing and the sealing means.

6. An instrument bearing comprising an elongated tubular housing, a shaft extending through the housing, means within the housing for journaling the shaft therein, a packing ring of disk shape surrounding the shaft outside of the bearing means and inserted in one end of the housing and closing the housing therearound, a retainer ring inserted into said end of the housing externally of the packing ring, a member inserted in the opposite end of the housing around the shaft, a seal interposed between said member and the shaft, and a seal interposed between said member and the housing.

7. An instrument bearing comprising an elongated tubular housing, a shaft extending through the housing, means within the housing for journaling the shaft therein, a packing ring of disk shape surrounding the shaft outside of the bearing means and inserted in one end of the housing and closing the housing therearound, a retainer ring inserted into said end of the housing externally of the packing ring, a member inserted in the opposite end of the housing around the shaft, said housing having a lubricant chamber therein around the shaft, an O-ring interposed between said member and the shaft, and an O-ring interposed between the periphery of said member and the interior of the housing.

8. An instrument bearing comprising an elongated tubular housing, a shaft extending through the housing, said housing having enlarged bores at opposite ends thereof, end-thrust bearings seated in the bores and journaling the shaft in the housing, a packing disk seated in the bore at one end of the housing externally of the bearing, a thrust collar rigid on the shaft in the bore at the opposite end of the housing and in position to bear against the end-thrust bearing therein, a member inserted in said bore on the opposite side of the thrust collar from the end-thrust bearing, means for sealing the periphery of said member to the interior of said bore in the housing, and means for sealing the interior of said member to the periphery of the shaft.

References Cited in the file of this patent

UNITED STATES PATENTS

| | | |
|---|---|---|
| 1,090,530 | Grube | Mar. 17, 1914 |
| 1,355,652 | Coppus et al. | Oct. 12, 1920 |
| 1,478,338 | Isom | Dec. 18, 1923 |
| 1,666,013 | Jackson | Apr. 10, 1928 |
| 1,740,475 | Murdoch | Dec. 24, 1929 |
| 1,830,679 | Schenck | Nov. 3, 1931 |
| 1,897,280 | Schwitzer et al. | Feb. 14, 1933 |
| 1,917,674 | Weaver | July 11, 1933 |
| 2,203,525 | Dupree | June 4, 1940 |
| 2,401,379 | Smith | June 4, 1946 |